(12) United States Patent
Sakamoto (10) Patent No.: US 7,864,231 B2
(45) Date of Patent: Jan. 4, 2011

(54) IMAGING APPARATUS AND DEFECTIVE PIXEL CORRECTING METHOD

(75) Inventor: Kunihide Sakamoto, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 615 days.

(21) Appl. No.: 11/898,754

(22) Filed: Sep. 14, 2007

(65) Prior Publication Data

US 2008/0068474 A1    Mar. 20, 2008

(30) Foreign Application Priority Data

Sep. 15, 2006  (JP) .............................. 2006-250604

(51) Int. Cl.
    H04N 9/64    (2006.01)
(52) U.S. Cl. ..................................... 348/247
(58) Field of Classification Search ................. 348/246, 348/247
    See application file for complete search history.

(56) References Cited

U.S. PATENT DOCUMENTS

| | | | | |
|---|---|---|---|---|
| 4,581,649 | A * | 4/1986 | Morokawa | 348/219.1 |
| 7,120,315 | B2 * | 10/2006 | Barkan | 382/294 |
| 7,580,071 | B2 * | 8/2009 | Uchiyama | 348/251 |
| 2004/0207738 | A1 * | 10/2004 | Wacker | 348/294 |
| 2005/0253940 | A1 * | 11/2005 | Chiba et al. | 348/247 |
| 2006/0007331 | A1 * | 1/2006 | Izumi et al. | 348/246 |

FOREIGN PATENT DOCUMENTS

JP    2004-112736    4/2004

* cited by examiner

Primary Examiner—Lin Ye
Assistant Examiner—Amy Hsu
(74) Attorney, Agent, or Firm—Dickstein Shapiro LLP (57) ABSTRACT

A disclosed imaging unit includes an image sensor in which plural light receiving elements are arranged in a matrix; a defective information storage unit configured to hold position information of a defective light receiving element in the image sensor; an imaging region moving unit configured to change an imaging region from a first imaging region corresponding to a desired imaging target region to a second imaging region, wherein the second imaging region is determined in such a manner that a position of a defective pixel corresponding to the defective light receiving element in an image of the second imaging region does not coincide with that in an image of the first imaging region; an imaging control unit configured to control the imaging unit and the imaging region moving unit in such a manner that a first imaging operation of picking up the image of the first imaging region and a second imaging operation of picking up the image of the second imaging region are performed in a single imaging operation; and a defective pixel correcting unit configured to correct defective pixel information created due to the defective light receiving element in image information obtained by the first imaging operation, with the use of pixel information obtained by the second imaging operation corresponding to a position of the defective pixel information in the image information obtained by the first imaging operation, according to the position information of the defective light receiving element held in the defective information storage unit.

9 Claims, 5 Drawing Sheets

IMAGING APPARATUS AND DEFECTIVE PIXEL CORRECTING METHOD

BACKGROUND OF THE INVENTION

1. Field of the Invention

The present invention relates to an imaging apparatus provided with an imaging unit including a CCD (Charge Coupled Device) image sensor or a CMOS (Complementary Metal Oxide Semiconductor) image sensor in which plural light receiving elements are arranged in a matrix, and a method for correcting defective pixels included in an image picked up by the imaging apparatus.

2. Description of the Related Art

In a semiconductor wafer process for manufacturing a CCD image sensor or a CMOS image sensor in which photodiodes (light receiving elements) are arranged in an array, point defects (a defect in a light receiving element at a particular point) and/or line defects (a defect in a light receiving element in a particular line) are often caused by particles generated during the process. These defects increase as the chip size of the image sensor is enlarged and/or intervals between the light receiving elements are reduced.

When there is a point defect or a line defect, a portion corresponding to the defect in an image will not be output properly, thus producing a defective pixel. Accordingly, there has been proposed a method of correcting a defective pixel in an image output from an image sensor, which defective pixel is caused by a point defect or a line defect. Specifically, the defective pixel is corrected according to an adjacent pixel or image information of an adjacent line of light receiving elements. In this method, the defective position is searched for and saved into a ROM in advance. The defective pixel, which is generated when an image of the imaging object is picked up, is corrected according to pixel information surrounding the defective pixel. Then, the corrected image is output.

Another defective pixel correcting method is proposed, in which the defective pixel is corrected without saving the defective position into a ROM (see, for example, Patent Document 1). In this method, a determining circuit is provided for determining whether a target pixel is a defective pixel. In the event that the determining circuit determines that the target pixel is a defective pixel, the target pixel is corrected according to pixel information surrounding the target pixel.

Patent Document 1: Japanese Laid-Open Patent Application No. 2004-112736

In both of the above-described defective pixel correcting methods, the image with the corrected defective pixel is an artificial (pseudo) image, and is thus not exactly the same as the actual image. Specifically, the quality of the image is degraded where the defective pixel has been corrected. For this reason, the number of defects which leads to degraded image quality is included among factors determining the product quality of an image sensor. Therefore, if there are many point defects and/or line defects, the image sensor will not be able to pass a product quality test, which reduces product yield.

SUMMARY OF THE INVENTION

The present invention provides an imaging apparatus and a defective pixel correcting method in which one or more of the above-described disadvantages are eliminated.

A preferred embodiment of the present invention provides an imaging apparatus and a defective pixel correcting method capable of precisely correcting a defective pixel without degrading the image quality of an image after the defective pixel has been corrected.

An embodiment of the present invention provides an imaging apparatus including an imaging unit including an image sensor in which plural light receiving elements are arranged in a matrix; a defective information storage unit configured to hold position information of a defective light receiving element in the image sensor; an imaging region moving unit configured to change an imaging region from a first imaging region corresponding to a desired imaging target region to a second imaging region, wherein the second imaging region is determined in such a manner that a position of a defective pixel corresponding to the defective light receiving element in an image of the second imaging region does not coincide with that in an image of the first imaging region; an imaging control unit configured to control the imaging unit and the imaging region moving unit in such a manner that a first imaging operation of picking up the image of the first imaging region and a second imaging operation of picking up the image of the second imaging region are performed in a single imaging operation; and a defective pixel correcting unit configured to correct defective pixel information created due to the defective light receiving element in image information obtained by the first imaging operation, with the use of pixel information obtained by the second imaging operation corresponding to a position of the defective pixel information in the image information obtained by the first imaging operation, according to the position information of the defective light receiving element held in the defective information storage unit.

An embodiment of the present invention provides a defective pixel correcting method for correcting a defective pixel in an image picked up by an imaging unit including an image sensor in which light receiving elements are arranged in a matrix, the defective pixel correcting method including the steps of determining a second imaging region that is different from a first imaging region corresponding to a desired imaging target region, wherein a position of the defective pixel corresponding to a defective light receiving element in an image of the second imaging region does not coincide with that in an image of the first imaging region; performing, in a single imaging operation, a first imaging operation of picking up the image of the first imaging region and a second imaging operation of picking up the image of the second imaging region; and correcting defective pixel information created due to the defective light receiving element in image information obtained by the first imaging operation, with the use of pixel information obtained by the second imaging operation corresponding to a position of the defective pixel information in the image information obtained by the first imaging operation.

According to one embodiment of the present invention, an imaging apparatus and a defective pixel correcting method are provided, which are capable of precisely correcting a defective pixel without degrading the image quality of an image after the defective pixel has been corrected.

BRIEF DESCRIPTION OF THE DRAWINGS

Other objects, features and advantages of the present invention will become more apparent from the following detailed description when read in conjunction with the accompanying drawings, in which:

FIGS. 3A and 3B illustrate imaging regions for describing a method of determining a second imaging region.

DETAILED DESCRIPTION OF THE PREFERRED EMBODIMENTS

A description is given, with reference to the accompanying drawings, of an embodiment of the present invention.

Figure 1:
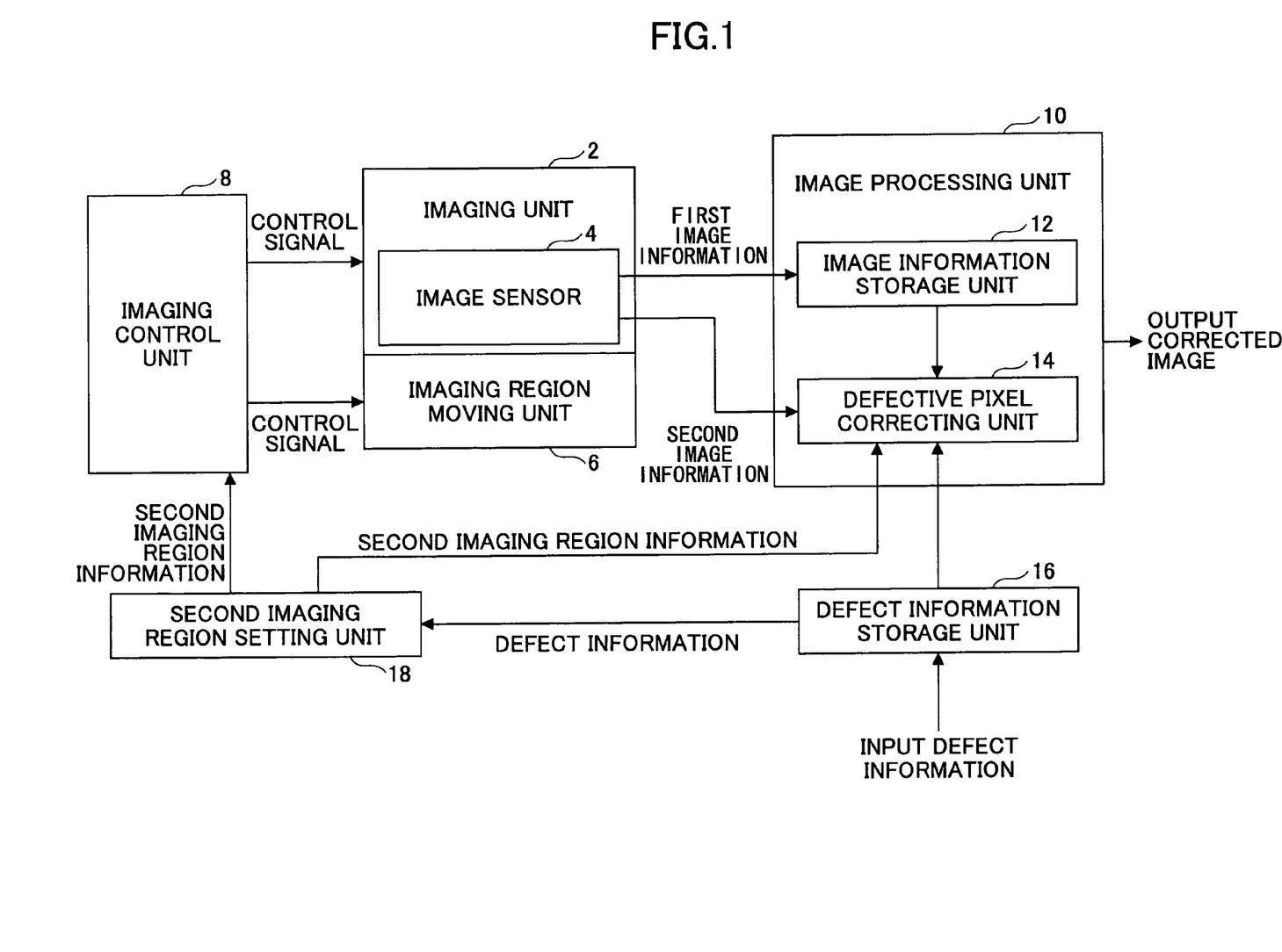
FIG. 1 is a block diagram of an imaging apparatus according to an embodiment of the present invention.

FIG. 1 is a block diagram of an imaging apparatus according to an embodiment of the present invention.

An imaging unit 2 includes an image sensor 4 in which plural light receiving elements are arranged in a matrix, and an optical system for causing light from an imaging object to pass (be incident on) the image sensor 4. The image sensor 4 is, for example, a CMOS image sensor, in which photodiodes acting as light receiving elements are arranged in a matrix. In the image sensor 4, there may be a defective light receiving element due to a crystal fault in the photodiode or a disconnection in the metal wiring connected to a shift register or an amp circuit, which disconnection may be caused by foreign matter. Such a defective light receiving element causes a point defect or a line defect. The image sensor 4 employed in an embodiment of the present invention has such a point defect or a line defect.

The imaging regions of the imaging unit 2 include a first imaging region that is the desired imaging object region, and a second imaging region that is shifted from the first imaging region by a predetermined distance. The imaging region of the imaging unit 2 can be switched between the first imaging region and the second imaging region by an imaging region moving unit 6.

The second imaging region is determined by a second imaging region setting unit 18. The second imaging region setting unit 18 determines the second imaging region in such a manner that a position of a defective pixel in the second imaging region does not coincide with a position of a defective pixel in the first imaging region. This determination is based on defect information in a defect information storage unit 16, which holds position information of a defective light receiving element in the image sensor 4 (defect information). Furthermore, if the image sensor 4 has a line defect, the second imaging region will be determined in such a manner that the defective pixels in the second imaging region do not overlap the defective pixels in the first imaging region as much as possible.

An imaging control unit 8 controls the imaging unit 2 and the imaging region moving unit 6 in such a manner that an image of the first imaging region is picked up first, and then an image of the second imaging region is picked up next, according to second imaging region information received from the second imaging region setting unit 18.

An image processing unit 10 includes an image information storage unit 12 for temporarily storing image information obtained by the first imaging operation (first image information), and a defective pixel correcting unit 14 for correcting a defective pixel in an image, which defective pixel is caused by a defective light receiving element. In the defective pixel correcting unit 14, defective pixel information in the first image information is supplemented with pixel information of image information obtained by the second imaging operation (second image information) corresponding to the position of the defective pixel information in the first image information. The image processing unit 10 outputs the image corresponding to the first image information (first image), after it is corrected with the use of the second image information.

Figure 2:
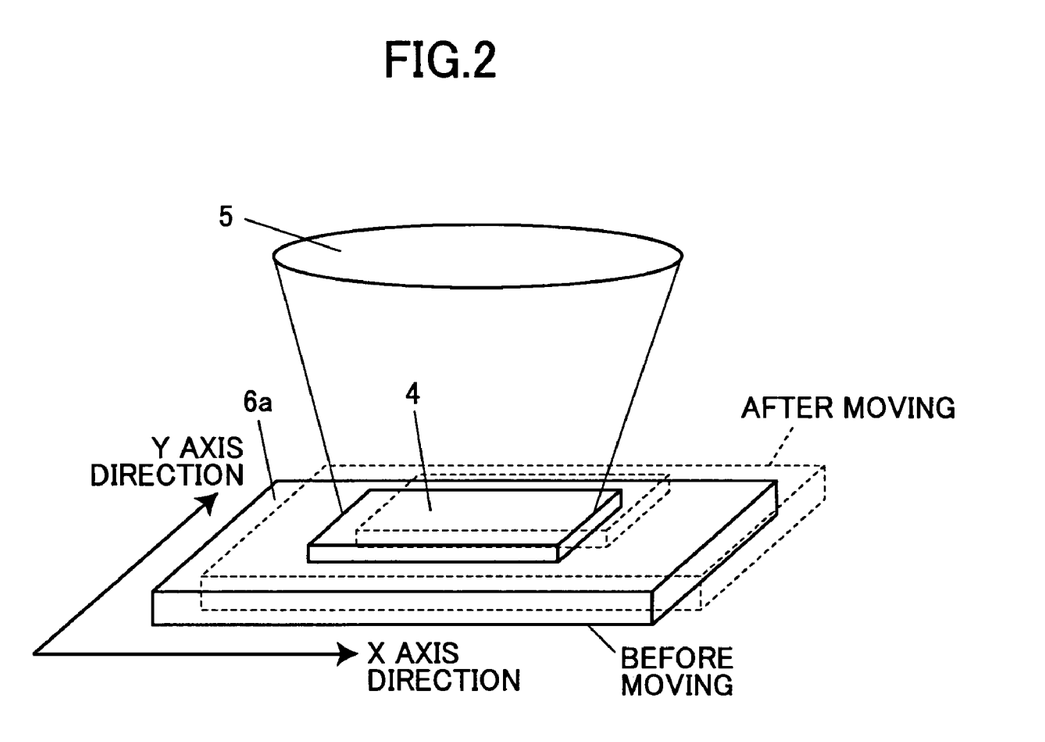
FIG. 2 is a perspective view of an imaging region moving unit shown in FIG. 1.

As shown in FIG. 2, the imaging region moving unit 6 is provided with a stage 6a that is movable in an X axis direction or a Y axis direction for moving an optical axis of light passing the image sensor 4 to move relatively with respect to the image sensor 4. The optical axis of light passing the image sensor 4 is fixed by a lens 5. As the stage 6a moves in a planar direction, light passing the image sensor 4 from an imaging object moves counter to the moving direction of the stage 6a. Accordingly, the imaging region of the image sensor 4 moves.

Figure 3A:
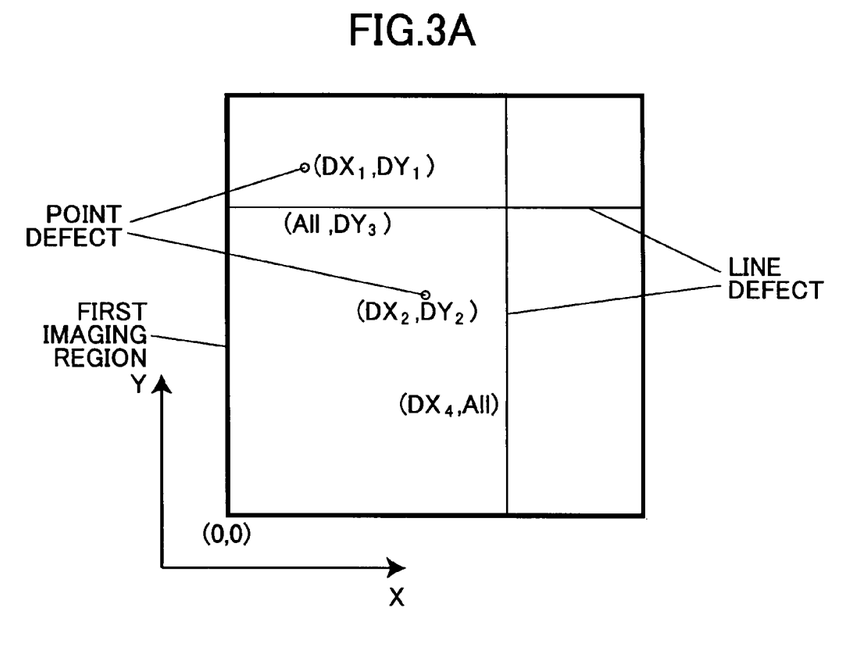
FIG. 3A illustrates a first imaging region and FIG. 3B illustrates the relationship between the first imaging region and the second imaging region.
Figure 3B:
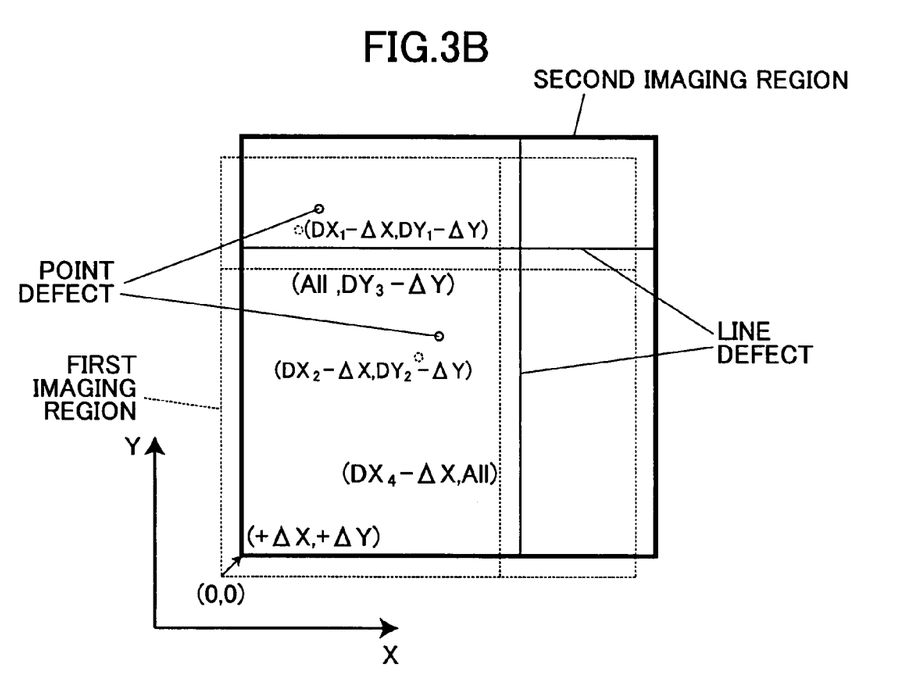

As shown in FIG. 3B, the second imaging region setting unit 18 determines the movement amount of the stage 6a in the X axis direction and the Y axis direction ($\Delta X$, $\Delta Y$), in such a manner that the position of the defective light receiving element of the image sensor 4 before the stage 6a is moved (first imaging region) does not coincide with the position of the defective light receiving element of the image sensor 4 after the stage 6a is moved (second imaging region). Furthermore, if the image sensor 4 has a line defect, the second imaging region setting unit 18 will determine the movement amount of the stage 6a in the X axis direction and the Y axis direction ($\Delta X$, $\Delta Y$), in such a manner that the defective pixels in the second imaging region do not overlap the defective pixels in the first imaging region as much as possible.

The movement amount of the stage 6a ($\Delta X$, $\Delta Y$) preferably satisfies ($\Delta X, \Delta Y$)=(ma,nb) (m, n being an integer equal to or larger than 1)

where the light receiving elements of the image sensor 4 are arranged with intervals a in the X axis direction and intervals b in the Y axis direction. Accordingly, the light receiving elements will not receive lights at the same positions in the first imaging operation and the second imaging operation. That is, the position at which the defective light receiving element receives light in the first imaging region will be different from that in the second imaging region, and therefore, an image without defective pixels can be virtually obtained.

As mechanisms for moving the stage 6a in the X axis direction and the Y axis direction, there is an X axis direction sliding mechanism for moving the stage 6a in the X axis direction and a Y axis direction sliding mechanism for moving the stage 6a in the Y axis direction. Each of the sliding mechanisms can be independently driven by a dedicated stepping motor.

A method for correcting a defective pixel is described with reference to FIGS. 3A, 3B.

As shown in FIG. 3A, the coordinates of the origin in the bottom left corner of an imaging region of the image sensor 4 are (0, 0). It is assumed that there are point defects at positions (DX1, DY1) and (DX2, DY2), and line defects at (All, DY3) and (DY4, All). If the second imaging region is determined to be at a position shifted from the first imaging region by +$\Delta X$ in the X axis direction and +$\Delta Y$ in the Y axis direction, the positions in the second imaging region corresponding to the defective pixels in the image of the first imaging region will be (DX1−$\Delta X$, DY1−$\Delta Y$), (DX2−$\Delta X$, DY2−$\Delta Y$), (All, DY3−$\Delta Y$), and (DY4−$\Delta X$, All), respectively, as shown in FIG. 3B. The pixel information in the first image information at (DX1, DY1), (DX2, DY2), (All, DY3), and (DY4, All) is replaced by the pixel information in the second image information at (DX1−ΔX, DY1−ΔY), (DX2−ΔX, DY2−ΔY), (All, DY3−ΔY), and (DY4−ΔX, All), respectively. As a result, the portions corresponding to defective pixels in the first image are supplemented with proper pixel information obtained in the second image.

Figure 4:
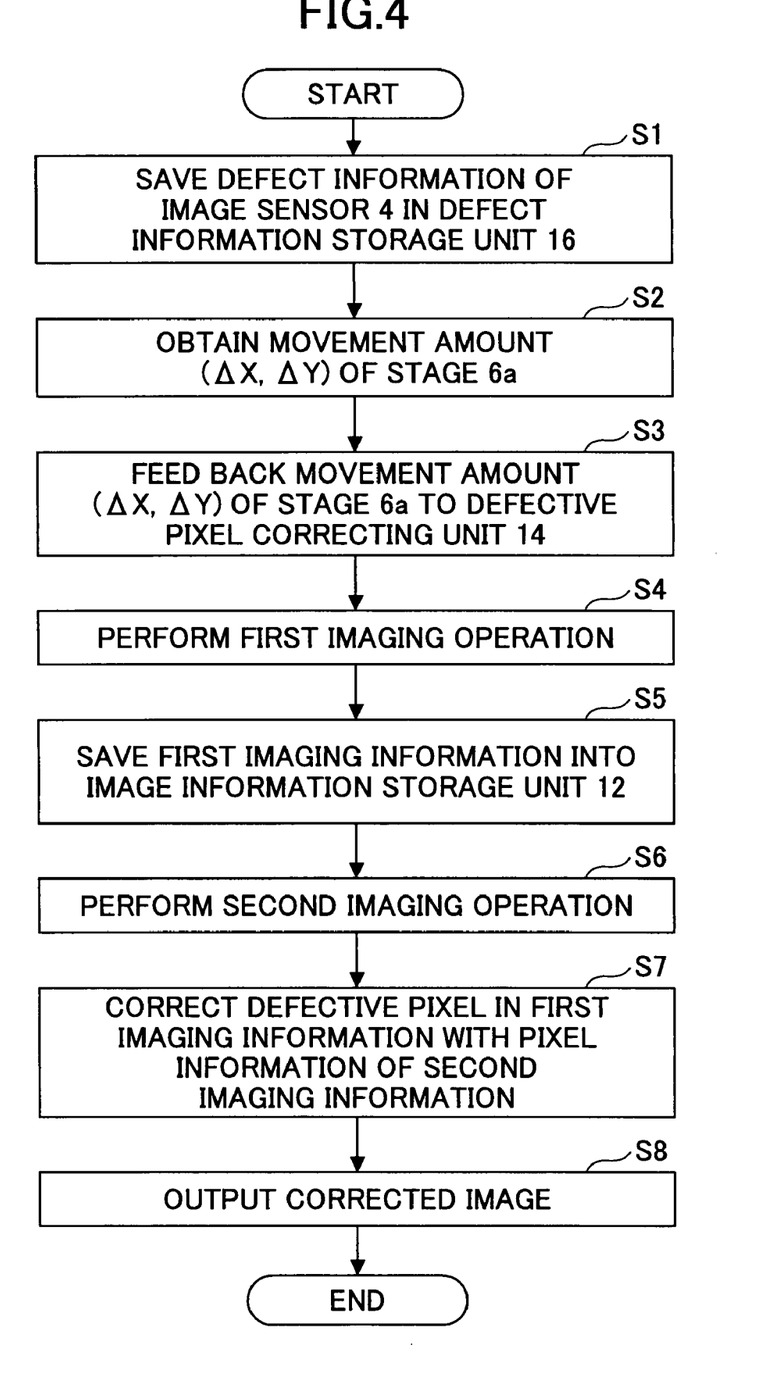
FIG. 4 is a flowchart of a defective pixel correcting method performed by the imaging apparatus.

FIG. 4 is a flowchart of a defective pixel correcting method performed by the imaging apparatus. In addition to FIG. 4, reference is made to FIGS. 1 through 3B to describe the defective pixel correcting method performed by the imaging apparatus according to an embodiment of the present invention.

Position information of a defective light receiving element in the image sensor is saved in the defect information storage unit 16 (step S1). Specifically, the position information of the defective light receiving element is obtained as follows. The image sensor 4 obtains an imaging result in a status where light is blocked and an imaging result in a status where light is uniformly irradiated. Based on these results, position information of a pixel with a darkness abnormality and position information of a pixel with a brightness abnormality are obtained and combined together to obtain a defective position (DXn, DYm). This position information (DXn, DYm) is saved in the defect information storage unit 16.

The movement amount of the stage 6a (ΔX, ΔY) is determined for obtaining the second imaging region information, which movement amount is determined so that the position of a defective light receiving element when picking up an image of the first imaging region before the image sensor 4 is moved does not coincide with the position of the defective light receiving element when picking up an image of the second imaging region after the image sensor 4 is moved (step S2). If the image sensor 4 has a line defect, the movement amount of the stage 6a in the X axis direction and the Y axis direction (ΔX, ΔY) will be determined in such a manner that defective pixels in the second imaging region do not overlap defective pixels in the first imaging region as much as possible.

The obtained second imaging region information is fed back to the defective pixel correcting unit 14 (step S3).

A first imaging operation is performed (step S4). In the first imaging operation, an image of the first imaging region is picked up, which corresponds to the desired object image.

The first image information is temporarily stored in the image information storage unit 12 (step S5). The image sensor 4 is moved by moving the stage 6a by the amount (ΔX, ΔY) that has been obtained, and a second imaging operation is performed (step S6).

The defective pixel correcting unit 14 corrects a defective pixel by replacing a defective pixel (DXn, DYm) in the first image information with pixel data ((DXn−ΔX), (DYm−ΔY)) in the second image information (step S7). The defective pixel (DXn, DYm) in the first image information is not properly output because the defective light receiving element received light at the corresponding position.

The image processing unit 10 outputs an image in which the defective pixel in the first image is corrected with the use of a proper pixel in the second image (step S8).

In the portions without any defects, it is possible to improve the precision of image data by averaging the results of the first imaging operation and the results of the second imaging operation.

As described above, the imaging apparatus performs a first imaging operation and a second imaging operation, and corrects a defective pixel in the first image with pixel information in the second image. Accordingly, even if there is a defective portion in the image sensor 4 and pixel information cannot be properly obtained at a position corresponding to the defective portion, the defective pixel information can be supplemented with pixel information obtained with a portion without any defects in the image sensor 4. Thus, it is possible to correct a defective pixel without degrading image quality. This configuration is particularly effectively applied to an image sensor for picking up a still image over a large area in which the imaging object substantially does not move, or to an image sensor that needs to satisfy rigorous requirements regarding the number of pixel defects.

Furthermore, if the imaging object is moving, the imaging apparatus can respond to such a situation by specifying a time difference between the first imaging operation and the second imaging operation in accordance with the moving speed of the imaging object. For example, it is assumed that light receiving elements of the image sensor 4 are arranged in the X axis direction with intervals 'a' and in the Y axis direction with intervals 'b', and the movement speed of the imaging object in the imaging region in the X axis direction and the Y axis direction is (Vx, Vy). A time interval 's' between the first imaging operation and the second imaging operation preferably satisfies $$s \leq a/(10 \times Vx) \text{ and } s \leq b/(10 \times Vy).$$

That is, the distance traveled by the imaging object during the time 's' between the first imaging operation and the second imaging operation is to be less than or equal to one tenth of each interval between the elements of the image sensor. Accordingly, the impact of the movement speed of the imaging object on the operation of correcting defective pixels can be mitigated to a negligible level.

Figure 5:
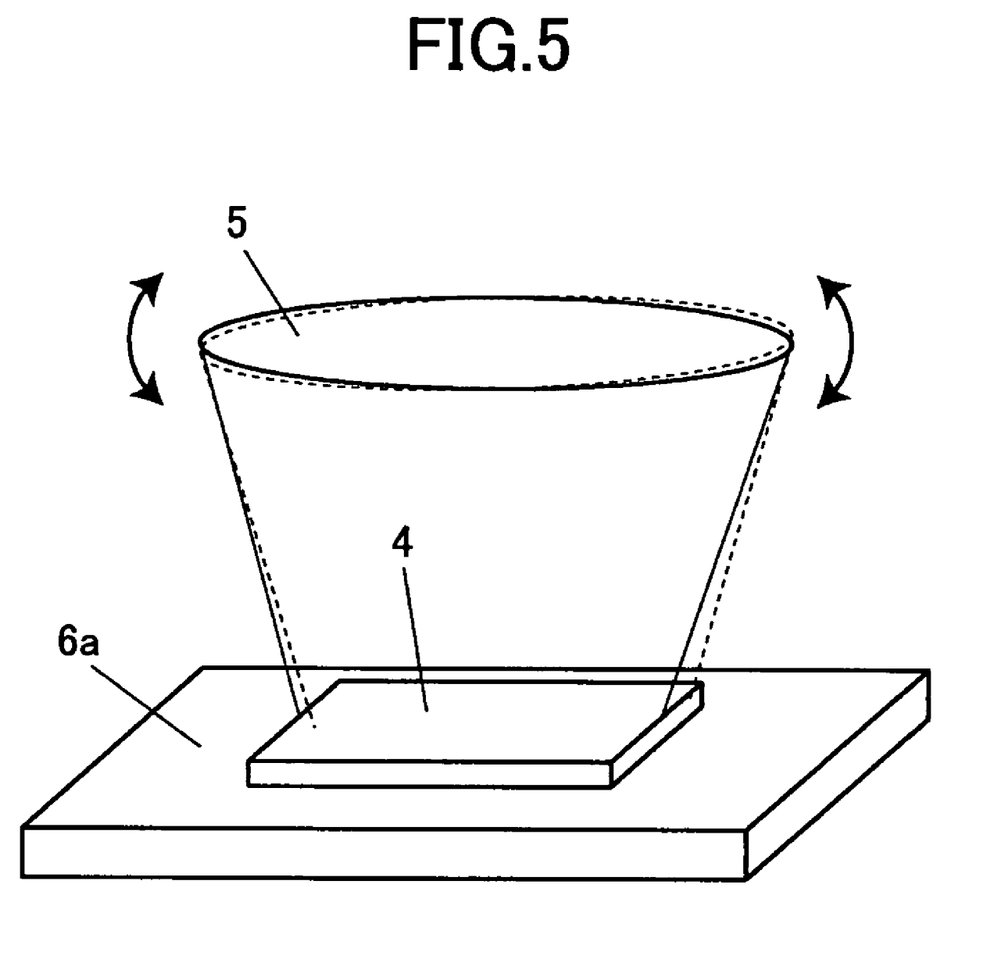
FIG. 5 is a perspective view of another imaging region moving unit.

In the above embodiment, the imaging region moving unit 6 moves the image sensor 4; however, the present invention is not limited thereto. As shown in FIG. 5, the image sensor 4 can be fixed, and the imaging region can be changed by changing the angle of the lens 5 that controls the optical axis of light passing the image sensor 4. In this method of moving the imaging region, the imaging region can be moved simply by changing the angle of the lens 5 that controls the optical axis of the light passing the image sensor 4, and is thus effective in a situation where the image sensor 4 cannot be moved due to structural restrictions such as the size of the imaging apparatus. In this case, the rotational angle of the lens 5 is to be associated with the movement amount of the imaging region.

An embodiment of the present invention provides an imaging apparatus including an imaging unit including an image sensor in which plural light receiving elements are arranged in a matrix; a defective information storage unit configured to hold position information of a defective light receiving element in the image sensor; an imaging region moving unit configured to change an imaging region from a first imaging region corresponding to a desired imaging target region to a second imaging region, wherein the second imaging region is determined in such a manner that a position of a defective pixel corresponding to the defective light receiving element in an image of the second imaging region does not coincide with that in an image of the first imaging region; an imaging control unit configured to control the imaging unit and the imaging region moving unit in such a manner that a first imaging operation of picking up the image of the first imaging region and a second imaging operation of picking up the image of the second imaging region are performed in a single imaging operation; and a defective pixel correcting unit configured to correct defective pixel information created due to the defective light receiving element in image information obtained by the first imaging operation, with the use of pixel information obtained by the second imaging operation corresponding to a position of the defective pixel information in the image information obtained by the first imaging operation, according to the position information of the defective light receiving element held in the defective information storage unit.

The imaging apparatus according to an embodiment of the present invention further includes a second imaging region setting unit configured to determine the second imaging region according to the position information of the defective light receiving element held in the defective information storage unit.

A preferred embodiment of the imaging region moving unit moves the image sensor in such a manner that an optical axis of light passing the image sensor changes relatively with respect to the image sensor, or changes an optical axis of light passing the image sensor.

Additionally, in a preferred embodiment of the present invention, the light receiving elements in the image sensor are arranged with intervals 'a' in an X axis direction and intervals 'b' in an Y axis direction; and the second imaging region is at a position shifted from the first imaging region by ma (m being an integer equal to or larger than 1) in the X axis direction and nb (n being an integer equal to or larger than 1) in the Y axis direction.

Additionally, in a preferred embodiment of the present invention, the light receiving elements in the image sensor are arranged with intervals 'a' in an X axis direction and intervals 'b' in an Y axis direction; an imaging target moves at a speed Vx, Vy in the X axis direction and the Y axis direction, respectively; and a time interval 's' between the first imaging operation and the second imaging operation satisfies $s \leq a/(10 \times Vx)$; and also $s \leq b/(10 \times Vy)$.

An embodiment of the present invention provides a defective pixel correcting method for correcting a defective pixel in an image picked up by an imaging unit including an image sensor in which light receiving elements are arranged in a matrix, the defective pixel correcting method including the steps of determining a second imaging region that is different from a first imaging region corresponding to a desired imaging target region, wherein a position of the defective pixel corresponding to a defective light receiving element in an image of the second imaging region does not coincide with that in an image of the first imaging region; performing, in a single imaging operation, a first imaging operation of picking up the image of the first imaging region and a second imaging operation of picking up the image of the second imaging region; and correcting defective pixel information created due to the defective light receiving element in image information obtained by the first imaging operation, with the use of pixel information obtained by the second imaging operation corresponding to a position of the defective pixel information in the image information obtained by the first imaging operation.

The defective pixel correcting method according to an embodiment of the present invention further includes a step of moving, for performing the second imaging operation, by a predetermined distance in such a manner that an optical axis of light passing the image sensor changes relatively with respect to the image sensor, or changing, for performing the second imaging operation, an optical axis of light passing the image sensor from that of the first imaging operation.

In a preferred embodiment of the defective pixel correcting method, the light receiving elements in the image sensor are arranged with intervals 'a' in an X axis direction and intervals 'b' in an Y axis direction; and the second imaging region is at a position shifted from the first imaging region by ma (m being an integer equal to or larger than 1) in the X axis direction and nb (n being an integer equal to or larger than 1) in the Y axis direction.

In a preferred embodiment of the defective pixel correcting method, the light receiving elements in the image sensor are arranged with intervals 'a' in an X axis direction and intervals 'b' in an Y axis direction; an imaging target moves at a speed Vx, Vy in the X axis direction and the Y axis direction, respectively; and a time interval 's' between the first imaging operation and the second imaging operation satisfies $s \leq a/(10 \times Vx)$; and also $s \leq b/(10 \times Vy)$.

In an imaging apparatus and a defective pixel correcting method according to an embodiment of the present invention, a first imaging operation of picking up an image of a first imaging region corresponding to a desired imaging target region and a second imaging operation of picking up an image of a second imaging region are performed in a single imaging operation. The second imaging region is determined in such a manner that a position of a defective pixel corresponding to a defective light receiving element in the image of the second imaging region does not coincide with that in the image of the first imaging region. Defective pixel information created due to the defective light receiving element in image information obtained by the first imaging operation is corrected with the use of pixel information obtained by the second imaging operation corresponding to a position of the defective pixel information in the image information obtained by the first imaging operation. Accordingly, image information at a position corresponding to the defective pixel can be supplemented with image information obtained by receiving light with a defect-free light receiving element. Therefore, it is possible to mitigate degradation of the image quality after the defective pixel has been corrected.

Furthermore, a portion corresponding to the defective pixel is not degraded in the image after the defective pixel has been corrected, which image is obtained by the imaging apparatus and the defective pixel correcting method according to an embodiment of the present invention. Therefore, even if the number of defects increases, it is possible to prevent the image quality from degrading. Consequently, this facilitates the image sensor to pass a product quality test regulating the number of defects that cause degraded image quality, which increases product yield.

The imaging apparatus according to an embodiment of the present invention further includes a second imaging region setting unit configured to determine the second imaging region according to the position information of the defective light receiving element held in the defective information storage unit. Accordingly, the second imaging region can be automatically determined according to the position information of the defective light receiving element of the image sensor, and therefore, it is possible to reduce the time required by the imaging apparatus to determine the second imaging region.

The light receiving elements in the image sensor are arranged with intervals 'a' in an X axis direction and intervals 'b' in an Y axis direction, and the second imaging region is at a position shifted from the first imaging region by ma (m being an integer equal to or larger than 1) in the X axis direction and nb (n being an integer equal to or larger than 1) in the Y axis direction. Accordingly, each light receiving element does not receive light at the same positions in the first imaging operation and the second imaging operation. As a result, the position at which the defective light receiving element receives light in the first imaging region will not coincide with that in the second imaging region, and therefore, an image without defective pixels can be virtually obtained.

The light receiving elements in the image sensor are arranged with intervals 'a' in an X axis direction and intervals 'b' in an Y axis direction; an imaging target moves at a speed Vx, Vy in the X axis direction and the Y axis direction, respectively; and a time interval 's' between the first imaging operation and the second imaging operation satisfies s≦a/(10×Vx); and also s≦b/(10×Vy). Accordingly, even if the imaging target is moving, the impact of the movement speed of the imaging target on the operation of correcting defective pixels can be mitigated.

The present invention is not limited to the specifically disclosed embodiment, and variations and modifications may be made without departing from the scope of the present invention.

The present application is based on Japanese Priority Patent Application No. 2006-250604, filed on Sep. 15, 2006, the entire contents of which are hereby incorporated by reference.

What is claimed is:

1. An imaging apparatus comprising:
   an imaging unit comprising an image sensor in which plural light receiving elements are arranged in a matrix;
   a defective information storage unit configured to hold position information of a defective light receiving element in the image sensor, wherein the position information of the defective light receiving element is obtained from an imaging result in a status where light is blocked and an imaging result in a status where light is uniformly irradiated, and based on said imaging results, position information of a pixel with a darkness abnormality and a position of a pixel with a brightness abnormality are obtained and combined together to obtain defective position coordinates of the defective light receiving element;
   an imaging region moving unit configured to change an imaging region from a first imaging region corresponding to a desired imaging target region to a second imaging region, wherein the second imaging region is determined in such a manner that a position of a defective pixel corresponding to the defective light receiving element in an image of the second imaging region does not coincide with that in an image of the first imaging region;
   an imaging control unit configured to control the imaging unit and the imaging region moving unit in such a manner that a first imaging operation of picking up the image of the first imaging region and a second imaging operation of picking up the image of the second imaging region are performed in a single imaging operation; and
   a defective pixel correcting unit configured to correct defective pixel information created due to the defective light receiving element in image information obtained by the first imaging operation, with the use of pixel information obtained by the second imaging operation corresponding to a position of the defective pixel information in the image information obtained by the first imaging operation, according to the position information of the defective light receiving element held in the defective information storage unit, wherein:
   the light receiving elements in the image sensor are arranged with intervals 'a' in an X axis direction and intervals 'b' in an Y axis direction,
   an imaging target moves at a speed Vx, Vy in the X axis direction and the Y axis direction, respectively, and
   a time interval 's' between the first imaging operation and the second imaging operation satisfies:

$s \leq a/(10 \times Vx)$; and also $s \leq b/(10 \times Vy)$.

2. The imaging apparatus according to claim 1, further comprising:
   a second imaging region setting unit configured to determine the second imaging region according to the position information of the defective light receiving element held in the defective information storage unit.

3. The imaging apparatus according to claim 1, wherein:
   the imaging region moving unit moves the image sensor in such a manner that an optical axis of light passing the image sensor changes relatively with respect to the image sensor.

4. The imaging apparatus according to claim 1, wherein:
   the imaging region moving unit changes an optical axis of light passing the image sensor.

5. The imaging apparatus according to claim 1, wherein:
   the light receiving elements in the image sensor are arranged with intervals 'a' in an X axis direction and intervals 'b' in an Y axis direction; and
   the second imaging region is at a position shifted from the first imaging region by ma (m being an integer equal to or larger than 1) in the X axis direction and nb (n being an integer equal to or larger than 1) in the Y axis direction.

6. A defective pixel correcting method for correcting a defective pixel in an image picked up by an imaging unit comprising an image sensor in which light receiving elements are arranged in a matrix, the defective pixel correcting method comprising the steps of:
   determining a second imaging region that is different from a first imaging region corresponding to a desired imaging target region, wherein a position of the defective pixel corresponding to position information of a defective light receiving element in an image of the second imaging region does not coincide with that in an image of the first imaging region;
   performing, in a single imaging operation, a first imaging operation of picking up the image of the first imaging region and a second imaging operation of picking up the image of the second imaging region; and
   correcting defective pixel information created due to the defective light receiving element in image information obtained by the first imaging operation, with the use of pixel information obtained by the second imaging operation corresponding to a position of the defective pixel information in the image information obtained by the first imaging operation,
   wherein the position information of the defective light receiving element is determined by obtaining an imaging result in a status where light is blocked and an imaging result in a status where light is uniformly irradiated, and based on said imaging results, position information of a pixel with a darkness abnormality and a position of a pixel with a brightness abnormality are obtained and combined together to obtain defective position coordinates of the defective light receiving element, wherein:

the light receiving elements in the image sensor are arranged with intervals 'a' in an X axis direction and intervals 'b' in an Y axis direction, an imaging target moves at a speed Vx, Vy in the X axis direction and the Y axis direction, respectively, and a time interval 's' between the first imaging operation and the second imaging operation satisfies:

$s \leq a/(10 \times Vx)$; and also $b/(10 \times Vy)$.

7. The defective pixel correcting method according to claim 6, further comprising a step of:

moving, for performing the second imaging operation, by a predetermined distance in such a manner that an optical axis of light passing the image sensor changes relatively with respect to the image sensor.

8. The defective pixel correcting method according to claim 6, further comprising a step of:

changing, for performing the second imaging operation, an optical axis of light passing the image sensor from that of the first imaging operation.

9. The defective pixel correcting method according to claim 6, wherein:

the light receiving elements in the image sensor are arranged with intervals 'a' in an X axis direction and intervals 'b' in an Y axis direction; and the second imaging region is at a position shifted from the first imaging region by ma (m being an integer equal to or larger than 1) in the X axis direction and nb (n being an integer equal to or larger than 1) in the Y axis direction.

* * * * *